Dec. 26, 1933.  T. W. ROLPH  1,941,109
HOLDER FOR REFRACTORS
Filed May 27, 1932  3 Sheets-Sheet 1

INVENTOR.
THOMAS W. ROLPH.
BY Jacob Liberman
ATTORNEY.

Dec. 26, 1933.    T. W. ROLPH    1,941,109
HOLDER FOR REFRACTORS
Filed May 27, 1932    3 Sheets-Sheet 2

INVENTOR.
THOMAS W. ROLPH
BY *Joe Shiberman*
ATTORNEY.

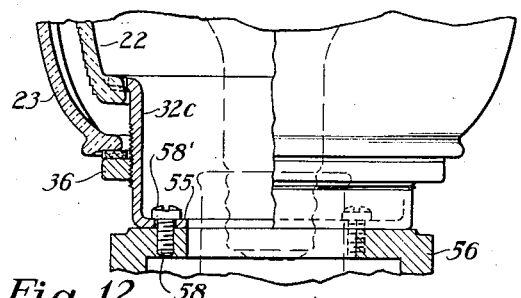
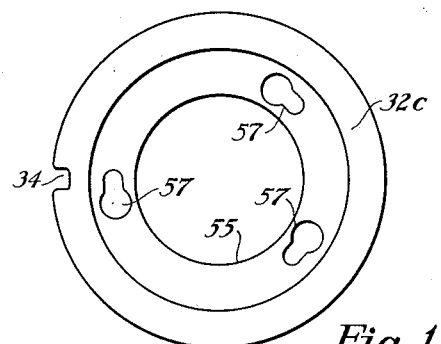
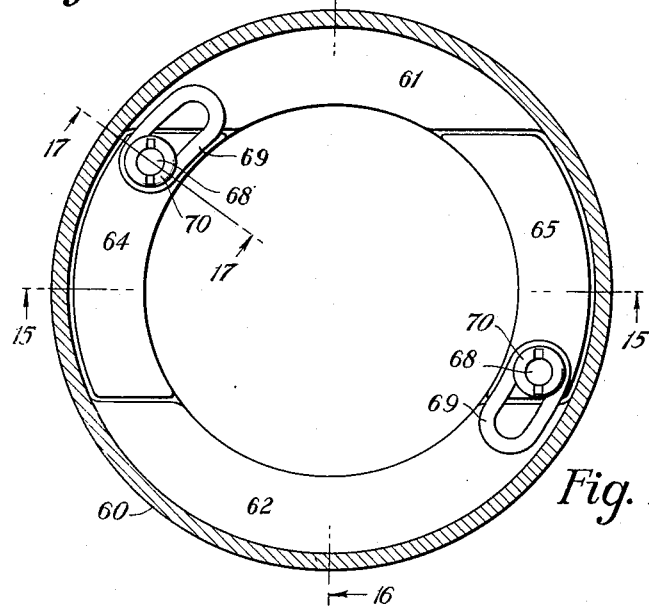
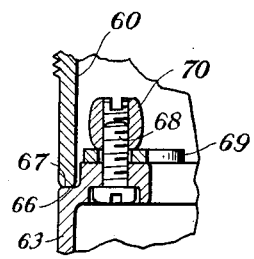
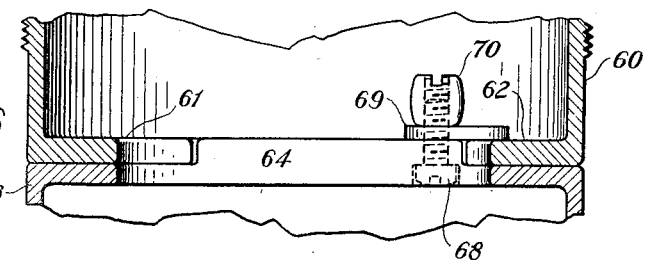
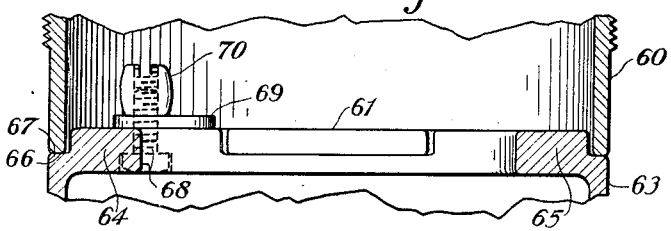

Patented Dec. 26, 1933

1,941,109

UNITED STATES PATENT OFFICE 1,941,109

HOLDER FOR REFRACTORS

Thomas W. Rolph, Newark, Ohio, assignor to Holophane Company, Inc., New York, N. Y., a corporation of Delaware Application May 27, 1932. Serial No. 613,906

13 Claims. (Cl. 240—135)

The present invention relates to holders for refractors, particularly those designed for street lighting work.

The present invention contemplates improvements in holders for refractors, particularly designed for supporting the refractors from below instead of from an upper flange as is now customary. The supporting of the refractors from underneath, especially with street lighting units having an upright lamp bulb, makes it possible to secure a more accurate relationship between the light center on the light bulb and the focal point of the refractor. This avoids the irregularities in placing of these parts which result from supporting a refractor from the upper flange and the lamp bulb from a socket carried below the refractor.

Street lighting refractors are generally enclosed in some form of protective envelope, or lantern body, somewhat larger than the refractor, supported directly from the pedestal and arranged with a removable roof or cover to give access to the interior of the lighting unit. The mounting of the refractor in place is accomplished after the outer envelope or lantern body is in place. Lamp renewals, cleaning, and servicing are accomplished when the cover is opened.

The present invention contemplates means for mounting the refractor on the pedestal or other support which means is designed to be accessible through the inside of the refractor, thereby making it unnecessary for one to reach down between the envelope or lantern and refractor to actuate the securing means employed.

Inasmuch as the refractors are generally made of two glass parts, the inner part being received within the outer part, the mounting means is preferably combined with a collar adapted to secure the two glass parts together, this collar being of such size and dimension as to place the focus of the refractor at the desired height.

To obtain asymmetric distribution of light it is customary to employ asymmetric refractors, and the present invention further contemplates providing the combined mounting means and collar with suitable devices whereby the orientation of the refractor to the proper angle about the axis of the pedestal or support is assured.

The accompanying drawings show, for purposes of illustrating the present invention, several embodiments in which the invention may take form, it being understood that the drawings are illustrative of the invention rather than limiting the same. In these drawings:

Fig. 12 is a fragmentary sectional view showing a modified form of refractor support having a vertically movable clamping means for clamping the parts in an axial direction;

Fig. 13 is a top plan view of the collar of Fig. 12;

Fig. 14 is a horizontal sectional view through another form of refractor supporting means employing axial clamping;

Figure 1:
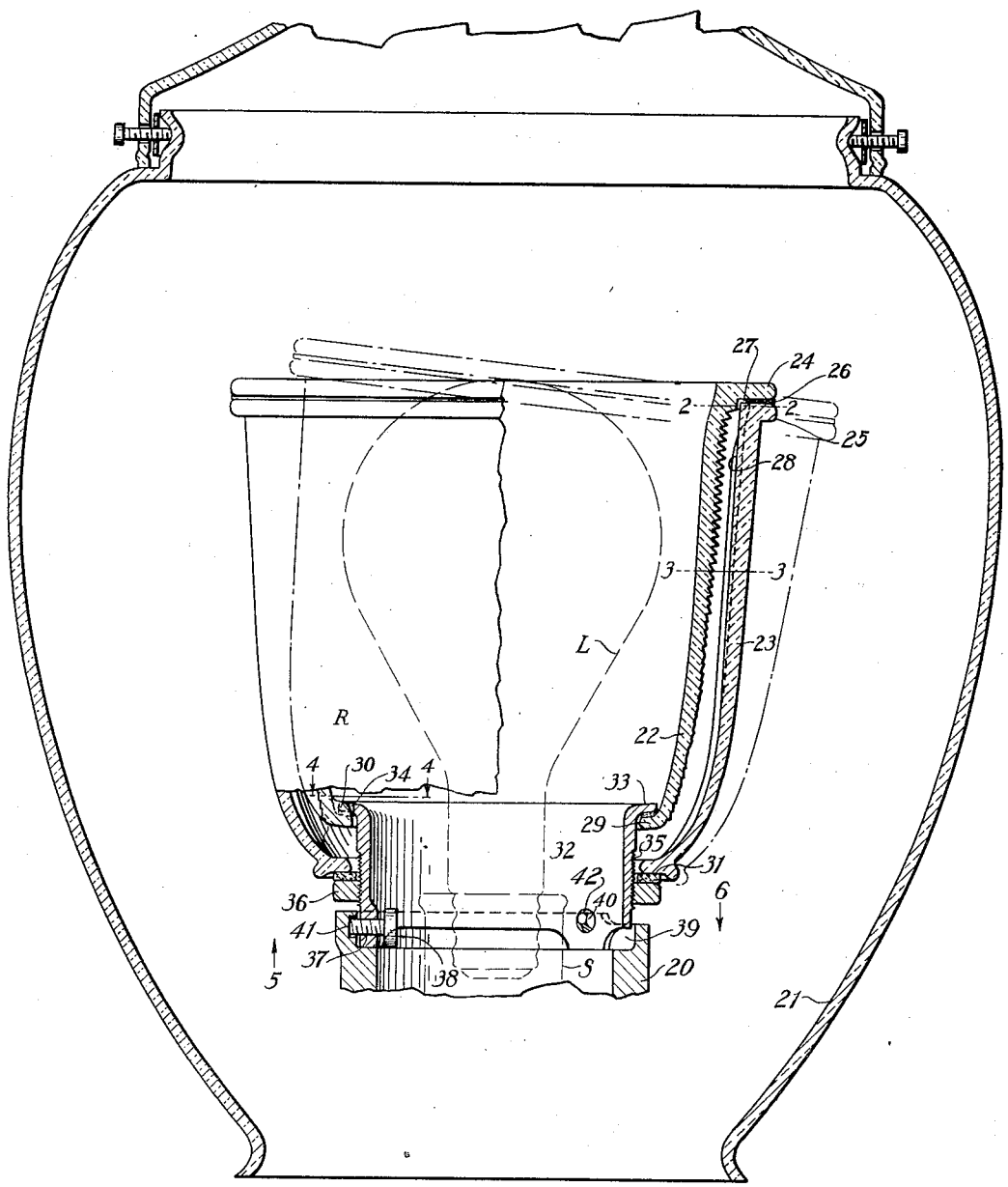
Fig. 1 is a vertical sectional view through the upper part of a street lighting unit showing the outer envelope, refractor, and refractor support, and indicating a radially adjustable securing device for the refractor support.
Figure 2:
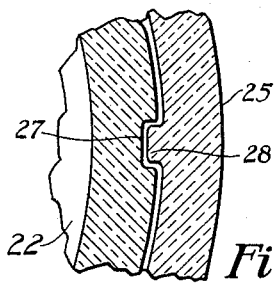
Fig. 2 is a fragmentary sectional view taken on the line 2—2 of Fig. 1, to show one of the aligning projections carried by the outer refractor and entering a well in the inner refractor.
Figure 3:
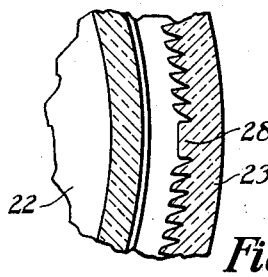
Fig. 3 is a section on the line 3—3 of Fig. 1.
Figure 4:
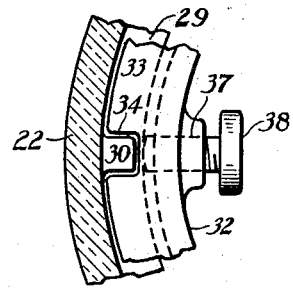
Fig. 4 is a sectional view on the line 4—4 of Fig. 1, showing a fragment of the refractor and collar.
Figure 5:
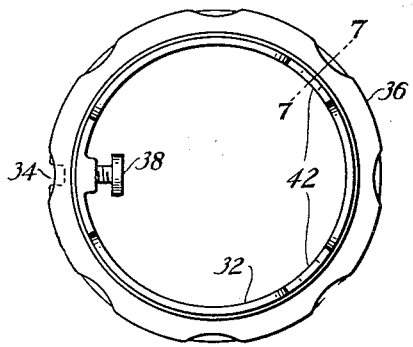
Fig. 5 is an inverted plan view of the collar and refractor clamping ring taken in the direction of the arrow 5 of Fig. 1.
Figure 6:
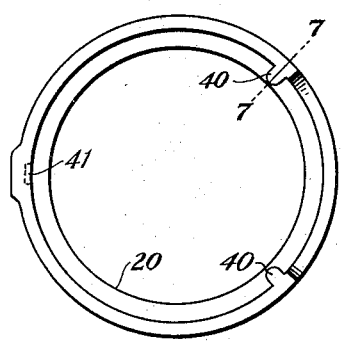
Fig. 6 is a top plan view of the pedestal taken in the direction of the arrow 6 of Fig. 1.
Figure 7:
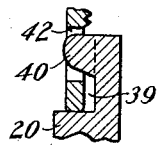
Fig. 7 is a fragmentary sectional view taken on the line 7—7 of Figs. 5 and 6.

Figs. 15 and 16 are sectional views taken on the lines 15—15 and 16—16, respectively, of Fig. 14; and Fig. 17 is a sectional view on the line 17—17 of Fig. 14.

The refractor supporting element placed at the top of the pedestal is illustrated at 20, and the outer protective envelope is shown at 21. The pedestal is provided to support the refractor and lamp socket and bulb while the outer envelope is supported in the usual manner, protects the refractor, and conceals it from observation.

In the form shown in the drawings, the refractor R is made of two parts 22 and 23. The outer surface of the inner refractor part 22 and the inner surface of the outer refractor part 23 have prismatic formation for light control and may be arranged to give symmetrical or asymmetrical distributions as desired. The upper end of the inner refractor has an outwardly extending flange 24 and the outer refractor 23 has an end flange 25.

These two flanges fit together as indicated, a gasket 26 being placed between them.

The upper part of the inner refractor 22 has notches or wells 27, preferably asymmetrically arranged about the refractor. The outer bowl 23 has aligning projections 28 which are adapted to enter these wells. These projections are carried down along the inner surfaces of the refracting bowl for a considerable distance as indicated in the line 28 of Fig. 1. The refracting bowls 22 and 23 are open at the bottom as indicated. The inner bowl is provided with an inwardly extending flange or rim 29 which has an aligning projection or lug 30. The lower face of the outer refracting bowl 23 has a seat portion 31 as shown.

The two parts of the refractor are secured together by a collar. This collar has a tubular member 32 flanged at its upper edge 33 and notched at 34 so as to fit the lower end of the inner refractor. It is threaded as indicated at 35 to receive a clamping ring 36 whereby the glass parts are clamped together.

From the foregoing it will be apparent that the refractor and collar are tubular in form and hence may be placed about an upright lamp bulb L. The conventional form of series lamp socket for holding it is indicated at S.

The lower end of the collar member 32 is provided with two openings 42 and with a tapped hole 37. A thumb screw 38 is threaded through this tapped hole from the inside. The upper end of the pedestal 20 is cut away as indicated at 39 to receive the lower end of the collar member 32. It is provided with two inwardly projecting members 40 spaced the same as the holes 42 and with a recess 41 as indicated. The refractor and locking collar form a unit which is pre-assembled and which is to be placed on or removed from the pedestal of the lighting unit while the protective envelope is in position.

In the form shown in Figs. 1-7, inclusive, the insertion of the unit is accomplished by first retracting the screw 38 so that it does not project beyond the outer surface of the member 32. The end of the screw is upset so as to prevent complete removal. The holes 42 in the collar are brought opposite the pins 40 while the refractor and collar are tilted as indicated in dot and dash lines in Fig. 1. They are then moved to the upright position and the screw 38 threaded out into the recess 41. This securely locks all the parts together and assures the proper orientation of the refractor and support. It makes it possible to not only place the refractor in position but to remove it without reaching in between the globe or envelope and the refractor.

Figure 8:
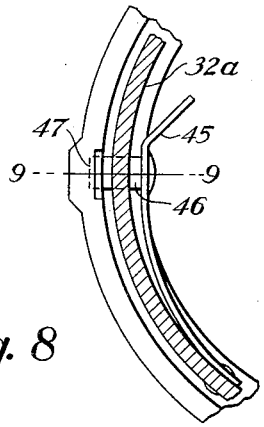
Fig. 8 is a fragmentary horizontal view showing a modified form of radially movable collar securing means.
Figure 9:
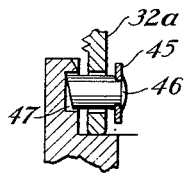
Fig. 9 is a section on the line 9—9 of Fig. 8.

In the forms shown in Figs. 8 and 9, the collar 32a is provided with a spring 45 adapted to press a bolt 46 into a recess 47 in the top of the pedestal. The spring may be pulled back to release the refractor.

Figure 10:
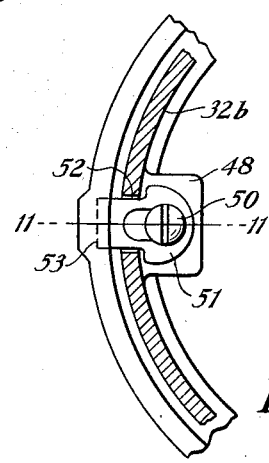
Fig. 10 is a fragmentary view of another form of radially movable collar securing means.
Figure 11:
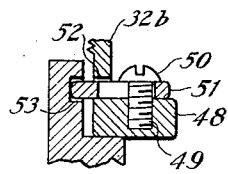
Fig. 11 is a section taken on the line 11—11 of Fig. 10.

In the forms shown in Figs. 10 and 11, the collar 32b is provided with a short inwardly flanged element 48 tapped at 49 to receive a screw 50. This screw extends through a slotted member 51 adapted to be projected out through a slot or opening 52 in the collar 32b and to enter into a recess 53 in the pedestal. Loosening the screw permits one to retract the sliding member 51.

In the form shown in Figs. 12 and 13, the glass parts and locking ring may be the same as previously described but the securing means is arranged for axial clamping. The collar 32c has an inwardly extending flange 55 adapted to rest on the upper part of the pedestal 56. The flange 55 has three asymmetrically placed slots 57 having wide and narrow portions as shown. The pedestal 56 is tapped to receive screws 58 whose heads 58' are able to pass through the wide parts of the slots 57 but not the narrow parts. When this form of holder is to be secured to the pedestal, it is passed down to position so that the heads of the screws pass through the slots and it is then given a partial revolution to bring the shanks of the screws into the narrow parts of the slots. The screws are then tightened up. These screws are readily observable from above and make it obvious to any one how to release the refractor and collar from the pedestal. Instead of cap screws, one of course could use upwardly extending threaded studs and nuts. The collar shown in Fig. 12 is longer than the collar shown in Fig. 1, so that the socket S may come above the upper surface of the pedestal and may be readily grasped for removal, if desired.

The collars may be made long or short to permit the removal of the lamp socket irrespective of the form of securing means employed, also for controlling the mounting height of the refractor.

In the form shown in Figs. 14-17, inclusive, the upper part of the collar securing the glass parts together is omitted from the drawings. The lower part of the collar is indicated at 60. It is provided with two inwardly extending flanges 61 and 62 of unlike angular extent. The pedestal is provided with an upper ring 63 which has two arc-shaped elevated platforms 64 and 65, which are asymmetrically placed so as to pass between the flanges 61 and 62.

The outer surface of the ring 63 is preferably turned or machined flat outside of these arcuate portions, as indicated at 66, so as to receive the turned lower end 67 of the collar 60. This affords suitable bearing surfaces between these two parts and assures the centering and asymmetric location of the collar on the pedestal. Suitable means for securing the collar on the pedestal by devices accessible through the refractor may include two screws 68 threaded up through the ring 63 from underneath, bridging members in the form of slotted straps 69, and nuts 70. The slotted links 69 may extend over on to the flanges 61 and 62 as indicated in Fig. 14 and thereby securely clamp the collar down on to the pedestal.

The collar securing arrangements herein shown are not necessarily limited to the support of upwardly opening refractors, but may be employed generally for pendant refractors or shades where access to the securing means through the inside of the shade or refractor is necessary or desirable.

It is obvious that the invention may be embodied in many forms and constructions within the scope of the claims, and I wish it to be understood that the particular forms shown are but a few of the many forms. Various modifications and changes being possible, I do not otherwise limit myself in any way with respect thereto.

What is claimed is:

1. In a street lighting unit, in combination, a supporting pedestal, an axially disposed, upwardly opening lamp socket carried thereby and adapted to carry a lamp bulb therein, a refracting bowl open at the top and bottom and adapted to receive the lamp bulb, a collar secured to the bowl so that the collar and bowl may be handled as a unit, and means for detachably securing the unit to the top of the pedestal including devices accessible through the inside of the bowl.

2. A street lighting unit as claimed in claim 1, wherein the refracting bowl is asymmetric about a vertical axis and the securing means is asymmetric, whereby the bowl is oriented at a predetermined angle about the axis of the pedestal.

3. A street lighting unit as claimed in claim 1, wherein the securing means includes inwardly extending members carried by the pedestal and entering openings in the collar and an outwardly movable member carried by the collar adapted to enter a recess in the pedestal.

4. A street lighting unit as claimed in claim 1, wherein the securing means includes inwardly extending members carried by the pedestal and entering openings in the collar, and a screw threaded through the collar and entering a recess in the pedestal.

5. A street lighting unit as claimed in claim 1, wherein the securing means includes an inwardly extending flange carried by the lower end of the collar and a clamping member carried by the pedestal and bearing on the flange.

6. A street lighting unit as claimed in claim 1, wherein the securing means includes an inwardly extending flange carried by the lower end of the collar, a pedestal carried member projecting upwardly through the flange, and a clamping member carried by the upper end of the pedestal carried member and bearing on the flange.

7. A street lighting unit as claimed in claim 1, wherein the securing means includes an inwardly extending flange carried by the collar and having slots with wide and narrow portions, and upwardly extending headed members carried by the pedestal and having shanks passing through the narrow portions of the slots and heads which pass through the wide portions only.

8. A street lighting unit as claimed in claim 1, wherein the pedestal has elevated portions entering between inwardly extending flanges carried by the collar and the securing devices are carried by the elevated portions and extend across onto the flanges.

9. A shade holder comprising a relatively fixed supporting ring having an inwardly opening recess and two inwardly projecting members on the opposite side of the ring, a relatively movable shade carrying ring of smaller diameter than the first ring and having two holes to receive the inwardly projecting members, and a retractable and protractable member carried by the second ring and adapted to enter the recess to lock the rings together or to be withdrawn to permit swinging the second ring into or out of concentric relation with the first ring.

10. A shade holder comprising a relatively fixed supporting ring having an inwardly opening recess and two inwardly projecting members on the opposite side of the ring, a relatively movable shade carrying ring having two holes to receive the inwardly projecting members, and a screw threaded through the ring and adapted to enter into the recess or be retracted from the recess.

11. A supporting device for a refractor having openings in the ends thereof, comprising an externally threaded tubular collar adapted to be inserted through the refractor and having a flange at one end engageable with the refractor, a clamping ring for clamping the refractor against the collar, the skirt of the collar having a threaded hole and two openings on the opposite side of the threaded hole, a screw in the threaded hole, and a support having inwardly extending pins adapted to enter the openings and an inwardly opening recess to receive the screw.

12. In combination, a tubular refractor having one end provided with an inwardly extending flange, an externally threaded tubular collar extending through said end and having an outwardly extending flange engageable with the flange on the refractor, a clamping ring threaded onto the collar for clamping the refractor flange against the collar flange, the collar having an inwardly extending discontinuous flange at the opposite end, a fixed support on which the inwardly extending flange rests and having elevated portions to enter between the flange portions, renewable bridging members extending from the elevated portions of the support onto the adjacent portions of the flange, and threaded clamping devices for securing the bridging members in place.

13. In combination, a tubular asymmetric refractor having one end provided with an inwardly extending flange, an externally threaded tubular collar extending through said end and having an outwardly extending flange engageable with the flange on the refractor, the collar and flange having cooperative alignment devices to orient the collar relative to the refractor, a clamping ring threaded onto the collar for clamping the refractor flange against the collar flange, the collar having an inwardly extending discontinuous flange at the opposite end, a fixed support, and having elevated portions to enter between the flange portions, the flange and support interfitting in only one position so that the collar and refractor are oriented on the support, renewable bridging members extending from the elevated portions of the support onto the adjacent portions of the flange, and threaded clamping devices for securing the bridging members in place.

THOMAS W. ROLPH.